No. 721,705. PATENTED MAR. 3, 1903.
C. W. HUNT.
VEHICLE.
APPLICATION FILED OCT. 31, 1902.
NO MODEL.

Attest:
A. N. Jesbera
L. E. Varney

Inventor:
Charles Wallace Hunt
by Redding, Kiddle, Greeley
Attys.

UNITED STATES PATENT OFFICE.

CHARLES W. HUNT, OF WEST NEW BRIGHTON, NEW YORK.

VEHICLE.

SPECIFICATION forming part of Letters Patent No. 721,705, dated March 3, 1903.

Application filed October 31, 1902. Serial No. 129,522. (No model.)

*To all whom it may concern:*

Be it known that I, CHARLES WALLACE HUNT, a citizen of the United States, residing in West New Brighton, borough of Richmond, city of New York, State of New York, have invented certain new and useful Improvements in Vehicles, of which the following is a specification, reference being had to the accompanying drawings, forming a part hereof.

In Letters Patent of the United States numbered 708,231, dated September 2, 1902, is shown a vehicle of a novel type having three trucks which are so arranged as to give facility in handling the vehicle around corners. The improvements therein described are applicable either to horse-drawn vehicles or to motor-vehicles, and in the application thereof to motor-vehicles the source of power is shown as mounted upon the forward steering-truck, while independent motors are applied to the carrying-trucks. Such an arrangement is feasible and may be preferred in some instances, especially when electricity is employed as the motive power. In other instances, particularly when a steam or internal-combustion engine is employed as the source of power, it may be less desirable to mount separate motors upon the carrying-trucks.

The present invention therefore has for its object to provide driving mechanism for vehicles of the character referred to by which power can be conveniently transmitted from the source of power on the steering-truck to the carrying-trucks, the improved mechanism being so constructed and arranged as to permit it to adapt itself to the relative movements of the several parts of the vehicle.

The invention will be more fully described hereinafter with reference to the accompanying drawings, in which—

Figure 1:
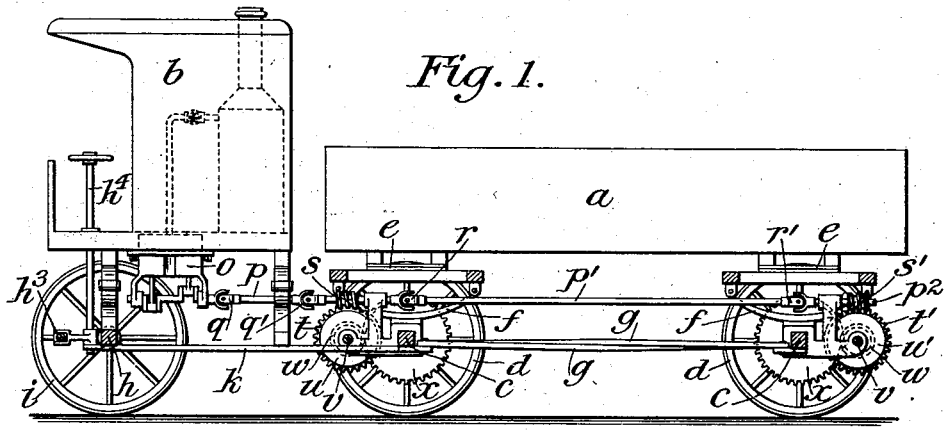
Figure 2:
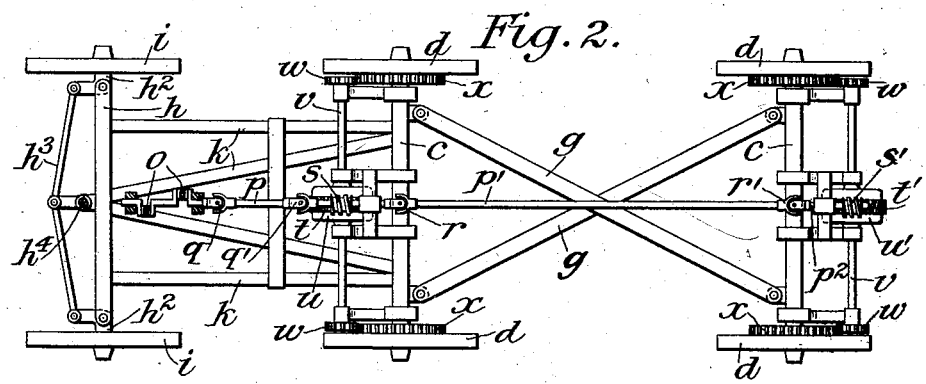
Figure 3:
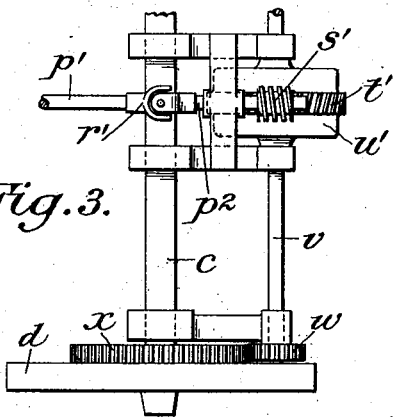

Figure 1 is a view, partly in side elevation with the axles in section, of a vehicle to which the invention is applied. Fig. 2 is a plan view of the same with the bodies removed. Fig. 3 is a detail, on an enlarged scale, of a portion of one of the carrying-trucks.

It will be understood that the details of the driving mechanism may be varied more or less without departing from the spirit of the invention and that the embodiment thereof which is illustrated in the drawings is chosen for purposes of explanation.

As described in the above-mentioned Letters Patent No. 708,231, the two bodies $a$ and $b$ are independent of each other, the body $a$ being supported upon two trucks, each of which may comprise an axle $c$ and wheels $d$, while the axle may be connected by long springs $f$ with a fifth-wheel, as at $e$, upon which the body $a$ is supported. As described in said Letters Patent, the middle and rear axle $c$ are connected together in such a manner, as by crossed bars or rods $g$, that the oscillation of one axle in a horizontal plane produces a corresponding oscillation of the other of the two axles in the opposite direction, whereby the wheels of the rear truck follow the wheels of the preceding truck when the vehicle is turning. The independent body $b$ is supported in any convenient manner upon a steering-truck, comprising an axle $h$ and wheels $i$, and upon a rigid frame or reach $k$, which connects the steering-truck with the adjacent carrying-truck. Obviously the forward axle $h$ may be swiveled with respect to the rigid frame or reach, or it may be rigid, as represented in the drawings, having at its ends stud-axles $h^2$, which receive the steering-wheels $i$ and are connected by suitable linkage $h^3$ with a steering-shaft $h^4$, conveniently mounted with respect to the body $b$. All of the parts thus far referred to may be constructed and arranged as shown in said Letters Patent or in any convenient or preferred manner.

For the propulsion of the vehicle the motor $o$, of whatever character, is mounted upon the body $b$ and is operatively connected with the driving or carrying wheels $d$ by the device about to be described. In suitable bearings on the steering-truck or body is supported a transmission-shaft $p$, which may be connected with the motor in any suitable manner and may be provided, if necessary, with joints, as at $q$ and $q'$, to accommodate relative vertical movements. This section of the transmission-shaft terminates in the vertical plane of the axle $c$ in a universal joint $r$ of any suitable character, by which it is connected with a second section $p'$ of the transmission-shaft, which likewise terminates in the vertical plane of the rear axle $c$ in a universal joint $r'$, by which it is connected with a third section $p^2$ of the transmitting-shaft. The location of the two joints $r$ and $r'$ is such that the distance between them is not materially changed during the movement of the vehicle and may be central or in the vertical axis of rotation of each axle, respectively, as shown in the drawings. The gearing between the driving-wheels of each truck and the corresponding shaft-section may be variously arranged, since such shaft-section occupies a definite relation with respect to its driving-wheels. As shown in the drawings, however, the shaft-section $p$ carries a worm $s$, which meshes with a worm-gear $t$ on the shell of a balanced gear $u$. The balance-gear may be of any suitable construction driving a two-part shaft $v$, each part of which may carry a pinion $w$, meshing with a gear $x$ on the corresponding driving-wheel. In like manner the section $p^2$ of the transmission-shaft may bear a worm $s'$, meshing with a worm-wheel $t'$ on a balance-gear $u'$, as before. The several parts of the transmission-shaft are supported in bearings which occupy an operative relation with respect to the axles and are consequently not affected by variations in the load upon the body. Furthermore, by reason of the location of the universal joints in the vertical planes of the axles and central, as shown in Fig. 2, the operation of the transmission-shaft is not affected by the horizontal oscillation of the axle in either direction. In each instance, moreover, the gearing between the transmission-shaft and the driving-wheels is in operative relation with a section of the transmission-shaft, which retains such a relation with respect to the axle that the operation of such gearing is not practically affected either by operation of the load or by oscillation of the axles with respect to the single continuous body, such as the body $a$, which they support and by which they are connected. The power developed in the motor is therefore transmitted to the driving-wheels without undue loss through complicated gearing or the binding of any parts of the transmission mechanism in the bearings thereof.

I claim as my invention—

1. In a vehicle, comprising a single, continuous body oscillating middle and rear trucks supporting and connected by said body and a forward steering-truck or body, the combination of a motor supported by the forward truck or body, a transmission-shaft operatively connected with the motor and comprising several sections, universal joints connecting said sections in the vertical planes of the middle and rear axles, whereby oscillation of one axle with respect to the other is permitted, and intermediate gearing between the driving-wheels of each truck and the corresponding section of the transmission-shaft, substantially as shown and described.

2. In a vehicle, comprising a single, continuous body oscillating middle and rear trucks supporting and connected by said body and a forward steering-truck or body, the combination of a motor supported upon the steering-truck or body, a transmission-shaft comprising one section operatively connected with the motor and in operative relation with the wheels of the middle truck, a section in operative relation with the wheels of the rear truck, and an intermediate section, universal joints in the vertical planes of the middle and rear axles connecting said intermediate section of the transmission-shaft with the other section, and gearing between two sections of the transmission-shaft and the corresponding driving-wheels, substantially as shown and described.

3. In a vehicle, comprising a single, continuous body oscillating middle and rear trucks supporting and connected by said body and a forward steering-truck or body, the combination of a motor supported on the steering-truck or body, a transmission-shaft operatively connected with the motor and comprising two sections each of which is in operative relation with the corresponding truck-wheels and an intermediate section, universal joints connecting said intermediate section with the other sections, balance-gears supported upon the middle and rear trucks respectively and operatively connected with the corresponding section of the transmission-shaft, and gearing between each balance-gear and the corresponding driving-wheels, substantially as shown and described.

This specification signed and witnessed this 25th day of October, A. D. 1902.

CHARLES W. HUNT.

In presence of—
ANTHONY N. JESBERA,
M. A. BRAYLEY.